United States Patent
Manske

(10) Patent No.: US 12,446,567 B1
(45) Date of Patent: Oct. 21, 2025

(54) RODENT DISPOSAL DEVICE

(71) Applicant: Jared Manske, Breckenridge, CO (US)

(72) Inventor: Jared Manske, Breckenridge, CO (US)

(*) Notice: Subject to any disclaimer, the term of this patent is extended or adjusted under 35 U.S.C. 154(b) by 65 days.

(21) Appl. No.: 18/631,300

(22) Filed: Apr. 10, 2024

(51) Int. Cl.
*A01M 23/38* (2006.01)

(52) U.S. Cl.
CPC .................... *A01M 23/38* (2013.01)

(58) Field of Classification Search
CPC ...... A01M 23/38; A01M 27/00; A01M 23/12; A01M 23/02; A01M 23/14; A01M 23/00
USPC ............... 43/73, 75, 76, 98, 99, 58
See application file for complete search history.

(56) References Cited

U.S. PATENT DOCUMENTS

| | | | | |
|---|---|---|---|---|
| 427,549 | A * | 5/1890 | Burton ................... | F41B 15/04 231/7 |
| 497,607 | A * | 5/1893 | Riggs ................... | A01M 27/00 43/84 |
| 936,429 | A * | 10/1909 | Dunn et al. ........... | A01M 23/36 43/80 |
| 1,326,641 | A * | 12/1919 | Brown ................... | A01M 27/00 43/84 |
| 1,519,113 | A * | 12/1924 | Burkhart ............... | A01M 23/00 43/79 |
| 2,480,593 | A * | 8/1949 | Moen ................... | A01M 27/00 102/370 |
| 4,074,456 | A * | 2/1978 | Tidwell ............... | A01M 1/2011 43/112 |
| 4,612,724 | A * | 9/1986 | Alboainin ............. | A01M 27/00 43/79 |
| 4,641,456 | A * | 2/1987 | Boharski ............... | A01M 23/12 43/73 |
| 5,185,953 | A * | 2/1993 | Gross ................... | A01M 23/12 43/75 |
| 5,691,510 | A * | 11/1997 | Turman ................ | A01M 23/26 43/88 |
| 6,802,152 | B2 * | 10/2004 | Hagen ................... | A01M 27/00 43/84 |
| 10,070,642 | B2 * | 9/2018 | Lubic ................... | A01M 31/002 |
| 12,089,583 | B2 * | 9/2024 | Krehel ................... | A01M 23/30 |
| 12,219,949 | B2 * | 2/2025 | Kletzli ................... | A01M 23/38 |
| 2012/0285075 | A1 * | 11/2012 | Lubic ................... | A01M 23/38 43/60 |

FOREIGN PATENT DOCUMENTS

WO WO-2019048347 A1 * 3/2019 ............ A01M 23/30

* cited by examiner

*Primary Examiner* — Timothy D Collins
*Assistant Examiner* — Maria E Graber

(57) ABSTRACT

Disclosed is a cylindrical tube placed at the top unit and ramps positioned into grooves on the base unit, wherein the rodent climbs one of the ramps in forward or aft directions into first end of the tube. The device also includes electrically charged thin metal plates on interior diameter of the tube. A PCB is located in the base unit below the tube and connected with metal plates to apply electrical shock to the rodent when the rodent touches the metal plates. The device further includes an electric motor at the base unit. A compression spring is configured horizontally in the middle part of tube and held back by PCB in first position. Subsequent to applying electric shock, the PCB releases the line to move spring to second position to extrude the rodent by first spring cap, such that the rodent is pushed and projected away from the device.

19 Claims, 1 Drawing Sheet

RODENT DISPOSAL DEVICE

FIELD OF THE INVENTION

The present invention relates to an animal trap and more particularly relates to trap for killing and disposing rodent such as rats and mice.

BACKGROUND OF THE INVENTION

Conventional rodent traps often involve manual operation including frequently and manually killing, resetting, rebaiting, and recharging the traps. Whenever the rodent is killed in the trap, the traps have to be reset. Further, handling a typical spring-loaded rodent traps poses risks to the user. Some traps are loaded with toxic baits. Thus, there is a possibility that a user might be injured while operating the spring-loaded traps and also exposed to harmful substances. Such process also incurs high cost and is time-consuming while manually maintaining a trap is inconvenient. When the number of traps in use in an environment is high, in addition to high costs of equipment, the trap management can be inefficient. Other types of traps include jaw trap, disposable trap, glue mousetrap, bucket trap and electric trap. Some traps are provided with toxic baits which are the only source of attraction to the rodents. The baits are typically placed at a location where the rodent is easily reachable and then there arises a need for rebaiting the trap.

Furthermore, these devices are needed to be monitored for the rodent to be killed, so the devices can be cleaned for further use. In battery operated traps, the replacement of batteries can incur additional costs. Some of the main drawbacks are that the traditional traps are either single use traps and/or are being toxic baited, the need to constantly check and rebait, requirement to have people touching dead infested rodents carcasses to remove them from the trap, witnessing of undue suffering, feeling of guilt, personal anguish to see, touch or dispose of dead rodents. The use of such toxic baits poisons and contaminates the wildlife, pets, and livestock i.e. negatively impacting the environment.

In electrical traps, the user safety is a concern when the electrocuting element is easily accessible by the user that it can be touched with fingers or hands of the user.

Therefore, it is evident that none of the conventional traps have all the functionalities including automated rodent killing, removal, disposal, resetting, no repeated baiting, multiple power source options and housing the electrocuting element at an unreachable location.

Hence, there is a need for a rodent trap that addresses aforementioned drawbacks.

BRIEF SUMMARY OF THE INVENTION

It is an object of the present invention to kill and dispose the rodents humanely by means of electrocution without manual intervention.

It is another object of the present invention to provide a trap that kills the rodent without needing to rebait the device.

It is another object of the present invention to provide a device to kill the rodent without the use of poisons.

It is further object of the present invention to provide a rodent trap that is safe for consumption by wildlife, pets and livestock.

It is further object of the present invention to provide a rodent trap that is easy in maintenance and safety to handle.

It is further object of the present invention to provide a rodent trap that is safe for both the user and the environment.

It is further object of the present invention to provide a rodent trap that disposes of the rodent without the need for a person to remove it, touch it, or see it.

According to an embodiment of the present invention, a rodent disposal device is disclosed. The device includes a top unit and a base unit connected together by using a connecting mechanism, wherein the base unit includes one or more grooves. The device also includes a cylindrical tube mounted at the top unit, wherein the tube includes a first end and a second end and is sized to limit accessibility of unwanted animals into the device. The device further includes a first cap connected, using a screw, on the second end of the cylindrical tube, wherein a bait is placed in the first cap. The device includes at least two ramps slidably positioned into the one or more grooves, wherein the rodent climbs one of the ramps in forward or aft directions and then enters into the first end of the cylindrical tube. The device also includes at least two electrically charged thin metal plates configured on the interior diameter of the cylindrical tube by means of an indention sized according to the metal plates. The device further includes a printed circuit board (PCB) located in the base unit below the cylindrical tube and connected with the thin metal plates via one or more electrical wires, wherein the PCB is configured to apply a deadly high voltage electrical shock to the rodent when the rodent touches the thin metal plates. The device includes an electric motor configured at the base unit, wherein the electric motor includes a rotating shaft. The device also includes a compression spring including a first end and a second end, wherein the compression spring is configured horizontally in the middle part of the cylindrical tube and held back by the PCB, in first position, via the electric motor and a line. The device further includes a first spring cap configured at the first end of the compression spring and a second spring cap configured at the second end of the compression spring, wherein the line extends perpendicularly from the first spring cap through the center of the compression spring and through the second end of the compression spring and second spring cap to connect to the rotating shaft of the electric motor, wherein, subsequent to applying the electric shock, the PCB releases the line to move the compression spring to second position in order to extrude the dead rodent by means of the first spring cap, such that the dead rodent is pushed through the cylindrical tube and is projected away from the device and wherein, consequent to projecting the rodent away from the device, the motor retracts the compression spring by winding up the line on the rotating shaft of the motor such that the first spring cap is pulled by the line to held back compression spring in first position.

BRIEF DESCRIPTION OF DRAWINGS

The present invention will become clearly understood to those of ordinary skill in the art when descriptions of exemplary embodiments thereof are read with reference to the accompanying drawings.

DETAILED DESCRIPTION OF THE INVENTION

The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention. For a more complete understanding of the present invention, reference is now made to the following descriptions taken in conjunction with the accompanying drawings.

Rodent disposal device, also referred to as, "rodent trap," "mouse trap," "animal trap" and "trap" is generally equipped with spring mechanism to trap and kill the rodents such as rats and mice. The method of killing the rodents by means of such device is considered inhumane. An improved rodent device comprises an electrocution mechanism wherein the rodents are killed in humane way.

Figure 1:
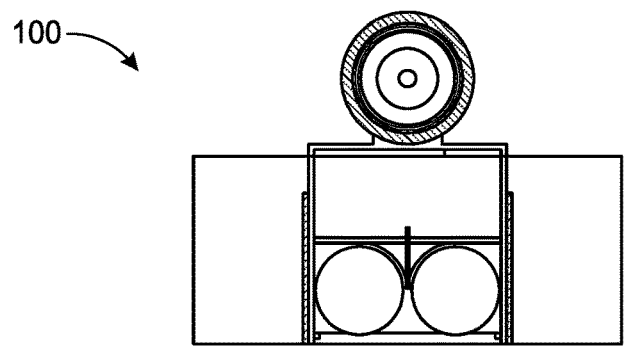
FIG. 1 is a front view of a rodent disposal device according to an embodiment of the invention.

The present invention relates to a rodent disposal device 200 which includes an electrocution mechanism to kill the rodent humanely. FIG. 1 shows a front view of a rodent disposal device 100. Using this device 100, hundreds of rodents can be killed without a human needing to dispose of the rodent and resetting the trap. Since the method of killing the rodents is performed by means of electrocution, instead of dangerous poisons, the dead rodents are safe to be consumed by wildlife, pets, or livestock.

Figure 2:
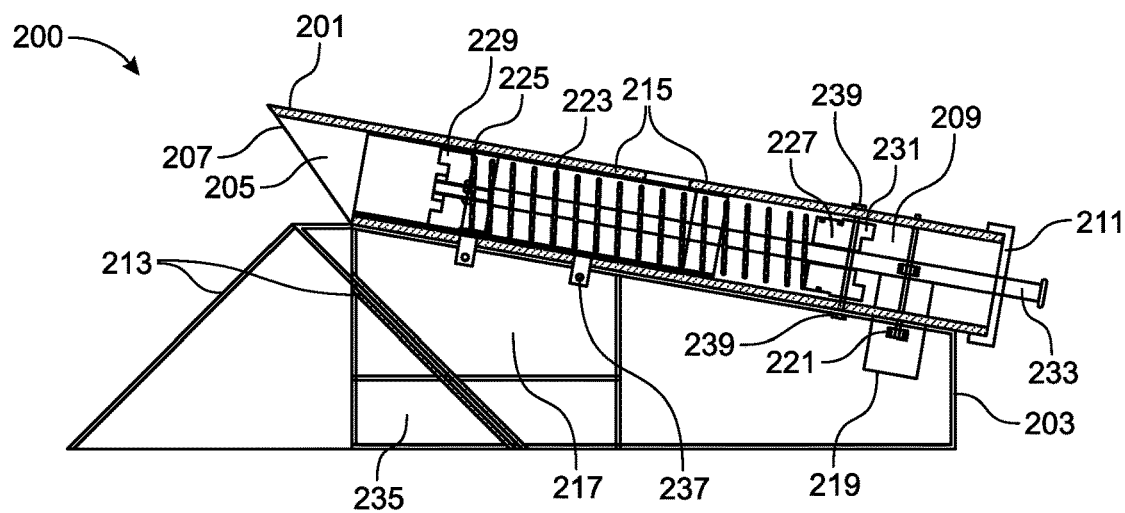
FIG. 2 is an elevation view of the rodent disposal device of the FIG. 1.

According to an exemplary embodiment, the rodent disposal device 200 comprises a top unit 201 and a base unit 203, as shown in FIG. 2, wherein the top unit 201 and the base unit 203 are connected together by means of a connecting mechanism 237 such as bolts, screws, fasteners, hinges, actuation units and the like. The base unit 203 includes one or more grooves (not shown). A cylindrical tube 205 is mounted at the top unit 201 and is sized to limit accessibility of unwanted animals into the device 200. In one aspect of the present invention, the base unit 203 supports the cylindrical tube 205 at an angle above horizontal about 10 degrees.

The cylindrical tube 205 includes a first end 207 and a second end 209 at the front side and the rear side respectively. The first end 207 of the cylindrical tube 205 is an active end while the second end 209 of the cylindrical tube 205 is an unactive end, wherein the cylindrical tube 205 includes a snap connection on the active end of the cylindrical tube 205 to connect to the base unit 203. The cylindrical tube 205 further includes a first cap 211 connected on the second end 209 of the cylindrical tube 205 by means of a screw. In one aspect, bait (not shown) is placed in the first cap 211 for the rodent to attract towards the device 200.

At least two ramps 213 are slidably positioned into the one or more grooves, wherein the grooves are sized according to the ramps 213 to be inserted into it. The rodent (not shown) climbs one of the ramps 213 in forward or aft directions, then enters into the first end 207 of the cylindrical tube 205, trying to reach the bait provided at the second end 209 of the cylindrical tube 205. In one aspect, the one or more grooves are located on one or more sides of the base unit 203 and the ramps 213 are integrally connected with the grooves by a connecting means. The base unit 203 further includes one or more electrical controls and one or more batteries 235.

In a preferred embodiment, at least two electrically charged thin metal plates 215 are configured on the interior diameter of the cylindrical tube 205 by means of an indention sized according to the metal plates 215. The electrically charged thin metal plates 215 are shaped the same diameter as inner diameter of the cylindrical tube 205. A printed circuit board (PCB) 217 is located in the base unit 203 below the cylindrical tube 205 and connected with the thin metal plates 215 via one or more electrical wires. In a preferred embodiment, the electrically charged thin metal plates 215 are connected at the bottom of the cylindrical tube 205 to the one or more electrical wires that connect to the PCB 217, such that the PCB 217 applies a deadly high voltage electrical shock to the rodent when the rodent touches the thin metal plates 215. The bait is never touched by the rodent, since the bait is placed at the second end 209 of the cylindrical tube 205 and the PCB applies electric shock prior to the rodent reaches bait. Thus, there is no need of rebaiting the device 200.

According to an embodiment, the electrically charged thin metal plates 215 and the PCB 217 together form the electrocution mechanism. The thin metal plates 215 are electrically charged by means of at least one power source including solar energy source, electrical wall power socket and battery operated power source.

Figure 3:
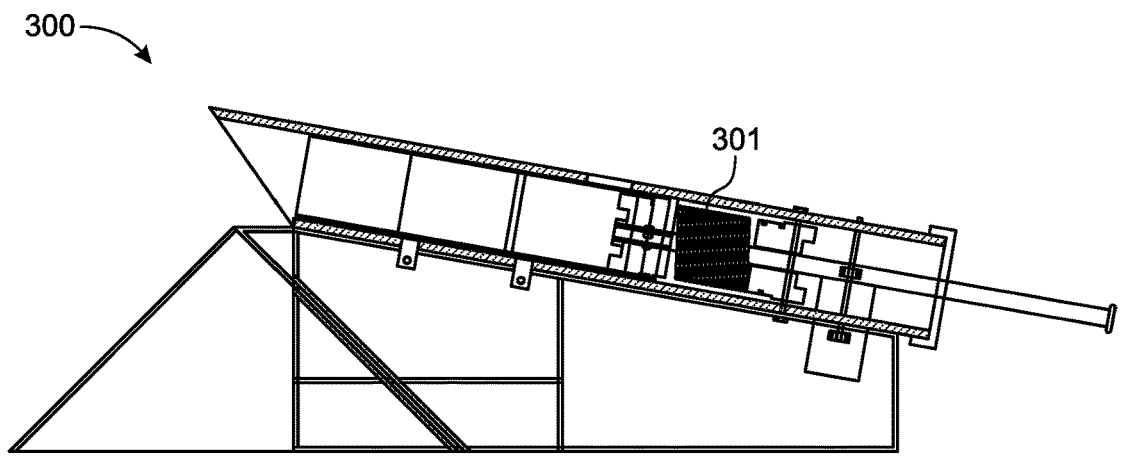
FIG. 3 is another elevation view of the rodent disposal device of the FIG. 1.

The device 200 includes an electric motor 219 which is configured at the base unit 203 with a rotating shaft 221. The device 200 further includes a compression spring 223 having a first end 225 and a second end 227 at the front portion and rear portion respectively. The first end 225 of the compression spring 223 is an active end while the second end 227 of the compression spring 223 is an unactive end. The compression spring 223 is configured horizontally in the middle part of the cylindrical tube 205 and held back by the PCB 217, in first position, via the electric motor 219 and a line 233. A rodent disposal device 300 is shown in FIG. 3, depicting a compression spring 301 in the first position, wherein the first position is the position in which the compression spring 223 is in retracted state or compressed state, which is also referred to as "retracted position" or "compressed position."

A first spring cap 229 is configured at the first end 225 of the compression spring 223 and a second spring cap 231 is configured at the second end 227 of the compression spring 223. The line 233 extends perpendicularly from the first spring cap 229 through the center of the compression spring 223 and through the second end 209 of the compression spring 223 and second spring cap 231 to connect to the rotating shaft 221 of the electric motor 219. According to one embodiment, further connecting with the rotating shaft 221, the line 233 extends outside the cylindrical tube 205 via the first cap 211 of the cylindrical tube 205. The first cap 211 of the cylindrical tube 205, the first spring cap 229 and the second spring cap 231 each includes a hole (not shown) through which the line 233 extends throughout the cylindrical tube 205. In one aspect, the line 233 is a threaded line. In another aspect, the line 233 is a rod 233. The line 233 is made of at least one of fiber and metal.

In an aspect, the first spring cap 229 is flat and smaller in diameter than the inner diameter of the cylindrical tube 205. The second end 209 of the cylindrical tube 205 includes two through bolts 239 connecting the second end 209 of the compression spring 223 and second spring cap 231 in place with the cylindrical tube 205 and the base unit 203.

Subsequent to applying electric shock, the PCB 217 releases the line 233 to move the compression spring 223 to second position in order to extrude the dead rodent by means of the first spring cap 229, such that the dead rodent is pushed through the cylindrical tube 205 and is projected away from the device 200. The second position is the position in which the compression spring 223 is in extended state. The shape of the cylindrical tube 205 allows the rodent to be projected away from the device 200 using the compression spring 223. The cylindrical tube 205 also confines the access point and guides the rodent to the correct location for disposal after it is deceased.

When the rodent is projected away from the device 200, consequently, the motor 219 retracts the compression spring 223 by winding up the line 233 on the rotating shaft 221 of the motor 219 such that the first spring cap 229 is pulled by the line 233 to held back the compression spring 301 in first position as shown in FIG. 3. The cylindrical tube 205 maintains the shape of the compression spring 223 to remain the same during compression. The compression spring 223 remains compressed until another rodent enters and activates the device 200.

According to the present invention, the thin metal plates 215 are configured at a place inaccessible by a user to touch with fingers or hands. Thus, the device 200 is safe to use. As aforementioned, the rodent is killed humanely by means of electric shock and disposed without the human intervention. As soon as the rodent is disposed by expanding the compression spring 223 via the line 233, the motor 219 retracts the compression spring 223 to the first position, which is also referred to as "original position" or "rest position." This implies that the device 200 is resets itself without manual intervention by the human. Further, since the bait is placed at the second end 209 of the cylindrical tube 205 and thus the rodent is unable to reach the bait to consume it, there is no need of rebaiting in the device 200. Furthermore, the metal plates 215 and the PCB 217 are placed at a location unreachable by the user hands or fingers, such that the device 200 provides high level of safety to user.

It will finally be understood that the disclosed embodiments are presently preferred examples of how to make and use the claimed invention, and are intended to be explanatory rather than limiting the scope of the invention as defined by the claims below. Reasonable variations and modifications of the illustrated examples in the foregoing written specification and drawings are possible without departing from the scope of the invention as defined in the claim below. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art, and within the scope of any claims that the above disclosure supports. The scope of the invention is accordingly defined by the following claims.

This application is intended to cover any adaptations or variations of the present invention. Therefore, it is manifestly intended that this invention be limited only by the claims and the equivalents thereof.

The invention claimed is:

1. A rodent disposal device comprising:
   a top unit and a base unit connected together by using a connecting mechanism, wherein the base unit includes one or more grooves;
   a cylindrical tube mounted at the top unit, wherein the tube includes a first end and a second end and is sized to limit accessibility of unwanted animals into the device;
   a first cap connected, using a screw, on the second end of the cylindrical tube, wherein a bait is placed in the first cap;
   at least two ramps slidably positioned into the one or more grooves, wherein a rodent climbs one of the ramps in forward or aft directions and then enters into the first end of the cylindrical tube;
   at least two electrically charged thin metal plates configured on the interior diameter of the cylindrical tube by means of an indention sized according to the metal plates;
   a printed circuit board (PCB) located in the base unit below the cylindrical tube and connected with the thin metal plates via one or more electrical wires, wherein the PCB is configured to apply a deadly high voltage electrical shock to the rodent when the rodent touches the thin metal plates;
   an electric motor configured at the base unit, wherein the electric motor includes a rotating shaft;
   a compression spring including a first end and a second end, wherein the compression spring is configured horizontally in the middle part of the cylindrical tube and held back by the PCB, in first position, via the electric motor and a line; and
   a first spring cap configured at the first end of the compression spring and a second spring cap configured at the second end of the compression spring,
   wherein the line extends perpendicularly from the first spring cap through the center of the compression spring and through the second end of the compression spring and second spring cap to connect to the rotating shaft of the electric motor,
   wherein, subsequent to applying the electric shock, the PCB releases the line to move the compression spring to second position in order to extrude the dead rodent by means of the first spring cap, such that the rodent is pushed through the cylindrical tube and is projected away from the device; and
   wherein, consequent to projecting the rodent away from the device, the motor retracts the compression spring by winding up the line on the rotating shaft of the motor such that the first spring cap is pulled by the line to held back compression spring in first position.

2. The device according to claim 1, wherein the first end of the cylindrical tube is an active end.

3. The device according to claim 1, wherein the second end of the cylindrical tube is an unactive end.

4. The device according to claim 1, wherein the PCB applies electric shock prior to the rodent reaching bait which is placed at the second end of the cylindrical tube, so the bait is never touched by the rodent.

5. The device according to claim 1, wherein the one or more grooves are located on one or more sides of the base unit.

6. The device according to claim 1, wherein the electrically charged thin metal plates are shaped the same diameter as inner diameter of the cylindrical tube.

7. The device according to claim 1, wherein the electrically charged thin metal plates are connected at the bottom of the cylindrical tube to the one or more electrical wires that connect to the PCB.

8. The device according to claim 1, wherein the first end of the compression spring is an active end.

9. The device according to claim 1, wherein the second end of the compression spring is an unactive end.

10. The device according to claim 1, wherein the first spring cap is flat and smaller in diameter than the inner diameter of the tube.

11. The device according to claim 1, wherein the thin metal plates are electrically charged by means of at least one power source including solar energy source, electrical wall power socket and battery operated power source.

12. The device according to claim 1, wherein the thin metal plates are configured at a place inaccessible by a user to touch with fingers or hands.

13. The device according to claim 1, wherein the base unit supports the cylindrical tube at an angle above horizontal about 10 degrees.

14. The device according to claim 1, wherein the second end of the cylindrical tube includes two through bolts connecting the second end of the compression spring and second spring cap in place with the cylindrical tube and the base unit.

15. The device according to claim 1, wherein further connecting with the rotating shaft, the line extends outside the cylindrical tube via the first cap of the cylindrical tube.

16. The device according to claim 1, wherein the first cap of the cylindrical tube, the first spring cap and the second spring cap each includes a hole through which the line extends throughout the cylindrical tube.

17. The device according to claim 1, wherein the line is a threaded line.

18. The device according to claim 1, wherein the line includes a rod.

19. The device according to claim 1, wherein the line is made of at least one of fiber and metal.

* * * * *